(12) United States Patent
Badr et al.

(10) Patent No.: US 6,967,769 B2
(45) Date of Patent: Nov. 22, 2005

(54) OPTICAL TRANSMISSION SYSTEMS AND OPTICAL AMPLIFIERS FOR USE THEREIN

(75) Inventors: Nabil M. Badr, Columbia, MD (US); Raymond Zanoni, Columbia, MD (US)

(73) Assignee: Corvis Corporation, Columbia, MD (US)

( * ) Notice: Subject to any disclaimer, the term of this patent is extended or adjusted under 35 U.S.C. 154(b) by 0 days.

(21) Appl. No.: 10/935,948

(22) Filed: Sep. 8, 2004

(65) Prior Publication Data

US 2005/0052730 A1 Mar. 10, 2005

Related U.S. Application Data

(63) Continuation of application No. 10/396,183, filed on Mar. 25, 2003, now Pat. No. 6,809,858, which is a continuation of application No. 09/310,324, filed on May 12, 1999, now Pat. No. 6,567,207.

(51) Int. Cl.$^7$ .............................................. H01S 3/00
(52) U.S. Cl. .............................. 359/341.32; 359/341.33
(58) Field of Search ...................... 359/341.32, 641.33; 372/38.06

(56) References Cited

U.S. PATENT DOCUMENTS

| | | | | |
|---|---|---|---|---|
| 4,616,898 A | | 10/1986 | Hicks | 350/96.15 |
| 5,173,957 A | * | 12/1992 | Bergano et al. | 385/24 |
| 5,323,404 A | | 6/1994 | Grubb et al. | 372/6 |
| 5,473,622 A | | 12/1995 | Grubb | 372/6 |
| 5,623,508 A | | 4/1997 | Grubb et al. | 372/3 |
| 5,673,280 A | | 9/1997 | Grubb et al. | 372/3 |
| 5,761,234 A | * | 6/1998 | Craig et al. | 372/75 |
| 5,764,405 A | * | 6/1998 | Alphonsus | 359/341.33 |
| 5,778,132 A | * | 7/1998 | Csipkes et al. | 385/135 |
| 5,805,621 A | | 9/1998 | Grubb et al. | 372/6 |
| 5,892,615 A | | 4/1999 | Grubb et al. | 359/341 |
| 5,912,761 A | * | 6/1999 | Jander et al. | 359/337.13 |
| 5,959,750 A | | 9/1999 | Eskildsen et al. | 359/134 |
| 5,966,206 A | * | 10/1999 | Jander et al. | 356/73.1 |
| 6,061,373 A | * | 5/2000 | Brockman et al. | 372/38.06 |
| 6,104,739 A | | 8/2000 | Hong et al. | 372/50 |
| 6,115,174 A | | 9/2000 | Grubb et al. | 359/334 |
| 6,118,575 A | | 9/2000 | Grubb et al. | 359/337 |
| 6,132,104 A | * | 10/2000 | Bliss et al. | 385/53 |
| 6,144,486 A | | 11/2000 | Bennett et al. | 359/337.13 |
| 6,151,338 A | | 11/2000 | Grubb et al. | 372/6 |
| 6,181,465 B1 | | 1/2001 | Grubb et al. | 359/337 |
| 6,212,310 B1 | | 4/2001 | Waarts et al. | 385/24 |
| 6,567,207 B1 | | 5/2003 | Badr et al. | 359/341.32 |
| 6,809,858 B2 | | 10/2004 | Badr et al. | 359/341.32 |

* cited by examiner

*Primary Examiner*—Jack Keith
*Assistant Examiner*—Deandra M. Hughes

(57) ABSTRACT

Optical systems of the present invention generally include at least one optical amplifier having a first pump source configured to supply power to said amplifier via a first pumping paths. A second pumping path is provided to supply power to the amplifier from a second pump source configured to replace power from the first pump source. The amplifier allows the replacement and repair of a pump source during operation by providing in-service hot swap capability, which increases the overall availability of the amplifier. The pump source can also be changed during operation to allow reconfiguration of the optical system.

20 Claims, 5 Drawing Sheets

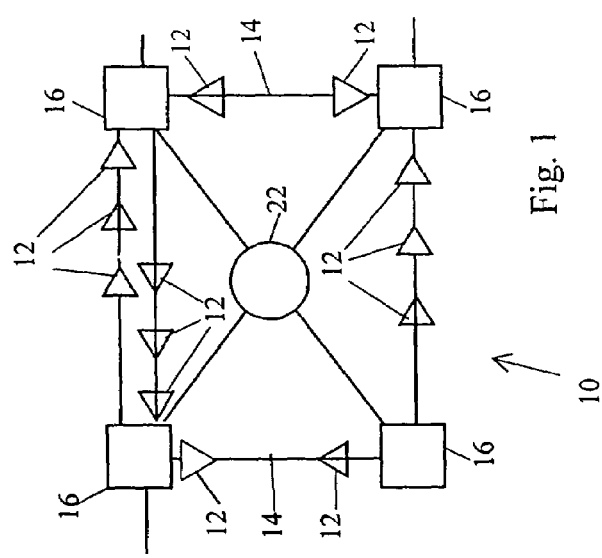
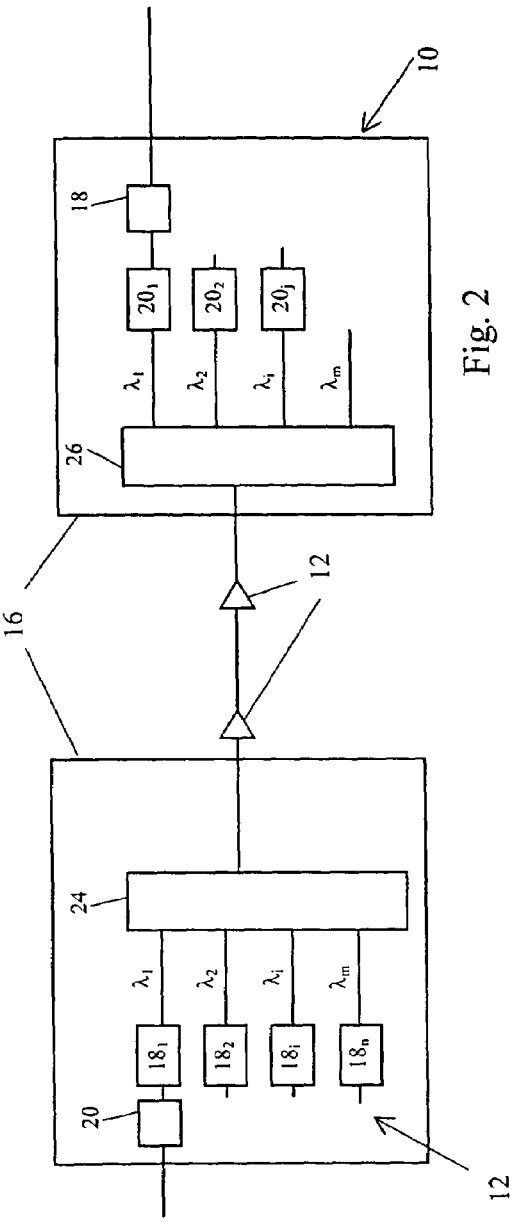
Fig. 1
Fig. 2

OPTICAL TRANSMISSION SYSTEMS AND OPTICAL AMPLIFIERS FOR USE THEREIN

CROSS-REFERENCE TO RELATED APPLICATIONS

The present application is a continuation of U.S. patent application Ser. No. 10/396,183, filed on Mar. 25, 2003, now U.S. Pat. No. 6,809,858 which is, in turn, a continuation of U.S. patent application Ser. No. 09/310,324, filed May 12, 1999, now U.S. Pat. No. 6,567,207.

STATEMENT REGARDING FEDERALLY SPONSORED RESEARCH OR DEVELOPMENT

Not Applicable

BACKGROUND OF THE INVENTION

The present invention is directed generally to optical transmission systems. More particularly, the invention is directed toward optical transmission systems including optical amplifiers configured to provide for in-service pump maintenance, replacement, and upgrades.

Digital technology has provided electronic access to vast amounts of information. The increased access has driven demand for faster and higher capacity electronic information processing equipment (computers) and transmission networks and systems to link the processing equipment.

In response to this demand, communications service providers have turned to optical communication systems, which have the capability to provide substantially larger information bandwidth transmission capacities than traditional electrical communication systems. Information can be transported through optical systems in audio, video, data, or other signal formats analogous to electrical systems. Likewise, optical systems can be used in telephone, cable television, LAN, WAN, and MAN systems, as well as other communication systems.

Early optical transmission systems, known as space division multiplex (SDM) systems, transmitted one information signal using a single wavelength in separate waveguides, i.e. fiber optic strand. The transmission capacity of optical systems was increased by time division multiplexing (TDM) multiple low bit rate, information signals into a higher bit rate signals that can be transported on a single optical wavelength. The low bit rate information carried by the TDM optical signal can then be separated from the higher bit rate signal following transmission through the optical system.

The continued growth in traditional communications systems and the emergence of the Internet as a means for accessing data has further accelerated the demand for higher capacity communications networks. Telecommunications service providers, in particular, have looked to wavelength division multiplexing (WDM) to further increase the capacity of their existing systems.

In WDM transmission systems, pluralities of distinct TDM or SDM information signals are carried using electromagnetic waves having different wavelengths in the optical spectrum, i.e., far-UV to far-infrared. The pluralities of information carrying wavelengths are combined into a multiple wavelength WDM optical signal that is transmitted in a single waveguide. In this manner, WDM systems can increase the transmission capacity of existing SDM/TDM systems by a factor equal to the number of wavelengths used in the WDM system.

Optical WDM systems were not initially deployed, in part, because of the high cost of electrical signal regeneration/amplification equipment required to compensate for signal attenuation for each optical wavelength throughout the system. The development of the erbium doped fiber optical amplifier (EDFA) provided a cost effective means to optically regenerate attenuated optical signal wavelengths in the 1550 nm range. In addition, the 1550 nm signal wavelength range coincides with a low loss transmission window in silica based optical fibers, which allowed EDFAs to be spaced further apart than conventional electrical regenerators.

The use of EDFAs essentially eliminated the need for, and the associated costs of, electrical signal regeneration/amplification equipment to compensate for signal attenuation in many systems. The dramatic reduction in the number of electrical regenerators in the systems, made the installation of WDM systems in the remaining electrical regenerators a cost effective means to increase optical network capacity.

The increased capacity of information transmitted in WDM systems has made system downtime increasingly more expensive in terms of lost capacity and revenue. Furthermore, the amount of excess system capacity must be increased accordingly to ensure a continued quality of service to customers in the event of a shutdown in part or all of the optical system.

While EDFAs have contributed greatly to the development of WDM systems, EDFAs are a source of failure that can result in the shutdown of an optical link in the system. More specifically, lasers and other optical sources, used in pump sources to supply optical energy to an erbium doped fiber in an EDFA, have proven to be a common point of failure in optically pumped amplifiers.

A pump source failure generally causes an amplifier and optical link shutdown resulting in lost revenues, degraded service quality, and unscheduled labor costs. Because of the high cost of amplifier shutdowns, pump sources generally include redundant optical sources to improve the reliability of the amplifiers.

The need for and use of redundant optical sources does reduce the power requirements and cost, as well as increase the reliability, of the optical sources. In various EDFA designs, multiple optical sources are combined and used to pump multiple fiber amplifiers to provide redundancy and to more cost effectively deploy the optical sources. For example, see U.S. Pat. Nos. 4,699,452, 5,039,199, and 5,173,957.

The use of redundant optical sources does not improve the reliability of the optical sources, but only the reliability of the optical amplifier. For example, the failure of an optical source in amplifiers having redundant optical sources will generally not cause an unplanned amplifier shutdown, but will usually require a planned maintenance shutdown to repair or replace the failed optical source. A planned maintenance shutdown allows communications traffic to be rerouted to provide continued service and work scheduled, which greatly reduces the cost of the maintenance. Nonetheless, traffic must still be rerouted and the link taken out of service to repair the failed or degraded pump sources resulting in lost revenue and increased costs.

The provisioning of optical systems and the traffic planning costs associated with rerouting of traffic imposes a substantial financial burden on communications service providers. Rerouting of traffic is a particular concern in optical systems that do not have a highly connected network or significant excess capacity to reroute traffic.

Given the trend of continually increasing communication traffic is not expected to diminish, the need for more reliable, higher capacity optical systems will continue to grow. Thus, it is imperative that optical systems be developed including optical amplifiers with increased reliability to allow the optical systems to be operated in an efficient, cost-effective manner.

BRIEF SUMMARY OF THE INVENTION

The apparatuses and methods of the present invention address the above need for more reliable optical systems and optical amplifiers. Optical systems of the present invention includes at least one optical amplifier having a first pump source configured to supply power to the amplifier via a first pumping path. The first pump source can include one or more optical sources, such as DFB or other lasers, that can provide optical energy in narrow or broad wavelength bands to an amplifying fiber.

A second pumping path is also provided to supply power to the amplifier from a second pump source configured to replace power from the first pump source. The first and second pump sources can be operated to replace power from one pump source with power from the other pump source. A controlled replacement of the power allows amplifier performance characteristics, such as the gain and gain profile, over a signal wavelength range to be maintained during pump source maintenance. In various embodiments, additional pumping paths and pump sources can be provided in the optical amplifier and analogously operated.

The optical amplifier can include various combinations of doped fiber amplifiers, such as EDFAs, and Raman fiber amplifiers in one or more amplifier stages and in concentrated, or lumped, and distributed form. In various embodiments, the first and second pumping path provide optical energy, "pump power" travelling in the same direction in the amplifier. In other embodiments, the pump power in the first and second pumping paths travels in opposite directions in the amplifying fiber. Similarly, the pump power can co-propagate and/or counter-propagate with communication signals being unidirectionally or bidirectionally transmitted in the fiber.

Pump power from the optical sources can be combined using one or more combiners as known in the art and in one or more stages as may be appropriate. In various embodiments, standard and WDM couplers, circulators, dichroic devices, prisms, gratings, and other combiners can be used with or without wavelength selective reflective and transmissive elements, such as Bragg gratings and Fabry-Perot or other filters.

In operation, the second pump source can be removably installed to provide pump power to the optical amplifier via the second pumping path. Once in place, the second pump source can be used to replace the pump power supplied by the first pump source to the amplifier and maintain control over the amplifier performance characteristics. When the power has been reduced to a safe level, the first pump source can be replaced or repaired as required. The replacement of pump power can be performed manually be service personnel, but more desirably would be computer controlled and implemented either locally or remotely depending upon the optical system embodiment.

The first pump source can be replaced with a replacement pump source, which will typically be a replacement first pump source, but can also be an upgraded or other pump source. The pump power provided by the second pump source can be replaced by the replacement pump source and the second pump source can be removed. Alternatively, the amplifier can be designed to operate with the second pump source during normal operation.

Accordingly, the present invention addresses the aforementioned need for more reliable optical systems and amplifiers. The improvement in reliability also provides increasingly flexible and upgradable optical amplifiers with higher availability for use in future optical systems. These advantages and others will become apparent from the following detailed description.

BRIEF DESCRIPTION OF THE DRAWINGS

Embodiments of the present invention will now be described, by way of example only, with reference to the accompanying drawings for the purpose of illustrating present embodiments only and not for purposes of limiting the same, wherein like members bear like reference numerals and:

FIGS. 1 and 2 show optical system embodiments.

DETAILED DESCRIPTION OF THE INVENTION

Figure 3B:
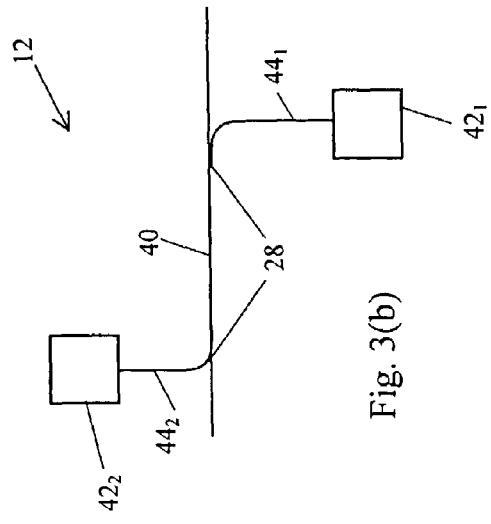
FIGS. 3($a$–$l$) show optical amplifier embodiments; and,
FIG. 4 shows an exemplary pump source embodiment.

Optical systems 10 of the present invention include an optical amplifier 12 disposed along an optical transmission fiber 14 to optically amplify optical signal passing between optical processing nodes 16. The optical system 10 will generally include one or more transmitters 18 configured to transmit information via one or more information carrying signal wavelength, or channels, ("signal wavelengths") $\lambda_i$ to one or more optical receivers 20. The optical system 10 can be configured in serially connected point to point links (FIG. 1) or in multi-dimensional networks controlled by a network management system 22 (FIG. 2).

The optical processing nodes 16 may also include other optical components, such as one or more add/drop devices and optical switches, routers, or cross-connects interconnecting the transmitters 18 and receivers 20. For example, broadcast and/or wavelength reusable, add/drop devices, and optical and electrical/digital cross connect switches and routers can be configured via the network management system 22 in various topologies, i.e., rings, mesh, etc. to provide a desired network connectivity.

The transmitters 18 transmit information in one or more signal wavelengths $\lambda_i$, which can be combined using an optical combiner 24 into a WDM optical signal and transmitted through the fiber 14. The transmitters 18 can include directly or externally modulated optical carrier sources or optical upconverters as known in the art. Likewise, optical distributors 26 can be provided to distribute the single or multiple wavelength optical signals to the receivers 20, which can include both direct and coherent receivers. For example, N transmitters 18 can be used to transmit M different signal wavelengths to J different receivers 20. In various embodiments, one or more of the transmitters 18 and receivers 20 can be wavelength tunable to provide wavelength allocation flexibility in the optical system 10.

The optical combiners 24 and distributors 26 can include wavelength selective and non-selective ("passive") devices, as well as polarization sensitive devices. Standard or WDM couplers/splitters 28, circulators 30, dichroic devices 32, prisms, gratings, etc., which can be used alone or in combination with various tunable or fixed transmissive or reflective filters, such as Bragg gratings 34, Fabry-Perot devices, etc. in various configurations of the optical combiners 24 and distributors 26. Furthermore, the combiners 24 and distributors 26 can include one or more stages incorporating various devices to multiplex and demultiplex signal wavelengths $\lambda_i$ in WDM optical systems 10.

FIGS. 3(a–l) show various embodiments of the optical amplifier 12 of the present invention. The amplifier 12 generally includes one or more amplifying media 40 supplied with power from a pump source 42 via a pumping path 44. It will be appreciated that the amplifier 12 can be a single stage or include multiple stages having the same or different amplifier designs in each stage. Also, the pump source 42 can be located proximate or remotely from the amplifying medium 40. In addition, the amplifier stages can be isolated and various signal processing, such as supervisory/service channel and signal wavelength add/drop, dispersion compensation, etc. can be performed between or proximate the stages.

Generally, the amplifying medium 40 will be a doped amplifying fiber and/or an amplifying fiber suitable for producing Raman gain in the signal wavelengths $\lambda_i$. One or more dopants can be used in the doped amplifying fiber 40 can include erbium, other rare earth elements such as Yb and Nd, as well as other dopants. For convenience, the amplifying medium will be generally described in terms of an amplifying fiber, also denoted as 40, but other amplifying medium, i.e., semiconductor, etc., 40 may be substituted by the skilled artisan. The doped and Raman amplifying fiber 40 can be provided as lumped or concentrated amplifiers at discrete amplifier sites and/or distributed in the transmission fiber 14.

The amplifying fiber can have the same or different characteristics than the transmission fiber 14. For example, dispersion compensating fiber, dispersion shifted fibers, standard single mode fiber and other fiber types can be intermixed as or with the transmission fiber 14 depending upon the system configuration. Thus, the amplifying fiber 40 can serve multiple purpose in the optical system, such as performing dispersion compensation in addition to amplification of the signal wavelength.

As shown in FIGS. 3(a–l) the amplifier 12 generally includes a first pump source $42_1$ that provides optical energy, or pump power, to the amplifying medium/fiber 40 via a first pumping path $44_1$. A second pumping path $44_2$ to the amplifying medium/fiber 40 is also provided in the amplifier 12, which can be used or unused during normal amplifier operation. A second pump source $42_2$ is provided to supply power to the amplifying fiber 40 via the second pumping path $44_2$ to replace power supplied by the first pump source $42_1$.

Figure 3A:
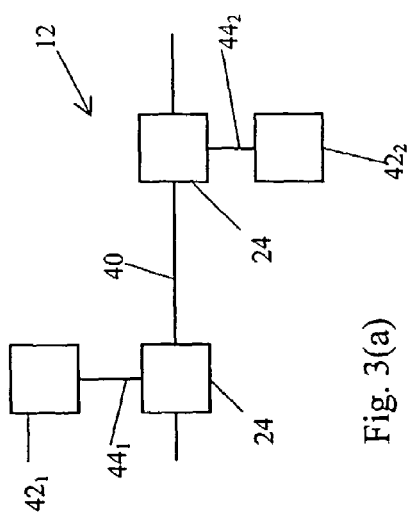

In FIG. 3(a), the first and second pump sources $42_1$ and $42_2$ supply power via pump wavelengths $\lambda_{p1}$ and $\lambda_{p2}$ to the amplifying fiber 40 in opposite directions. The signal wavelengths $\lambda_i$ can be traveling uni-directionally or bi-directionally to and through the amplifying fiber 40, as previously described.

The pump wavelengths $\lambda_{p1}$ and $\lambda_{p2}$ supplied by the pump sources 42 can be the same or different wavelengths within the same wavelength range or different wavelength ranges. For example, pump wavelengths in the 1480 nm, and 980 nm wavelength ranges, as well as other less common ranges can be used to pump erbium doped fiber. Likewise, the pump wavelengths can be at the same or different wavelengths within wavelength ranges that will stimulate Raman amplification of signal wavelengths. For example, pump wavelengths in the 1420–1520 nm range can be used to produce Raman gain in signal wavelengths in the 1520–1620 nm range. Likewise, other pump and signal wavelengths can also be used depending upon the optical system 10 and the transmission fiber 14.

It should be noted that when different pump wavelengths are supplied, the power required to maintain or otherwise control the amplifier performance characteristics will generally be different. Likewise, the power requirements may also vary depending upon the direction traveled by the pump power relative to the signal wavelengths, even if the pump wavelengths are the same from the two pump sources.

The choice of pump wavelengths can affect the choice of combiners 24 used to deliver the pump power to the amplifying fiber 40. For example, when couplers 28 are used in the configuration of FIG. 3(a) as shown in FIG. 3(b), it may be necessary to isolate the pump sources from pump power emitted by the other pump source.

Figure 3D:
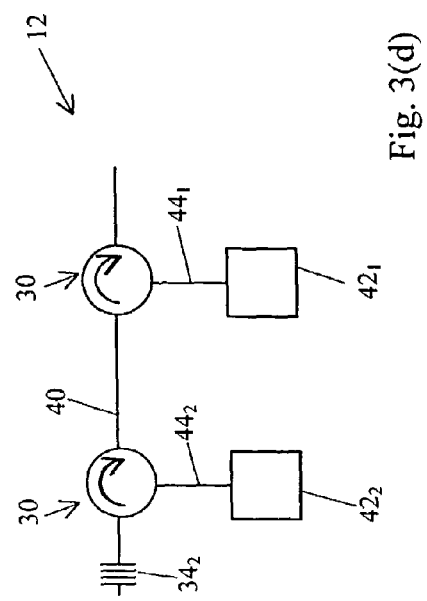
Figure 3C:
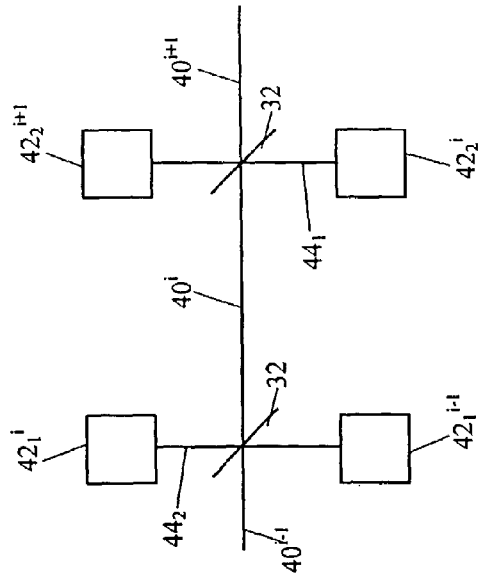
Figure 3F:
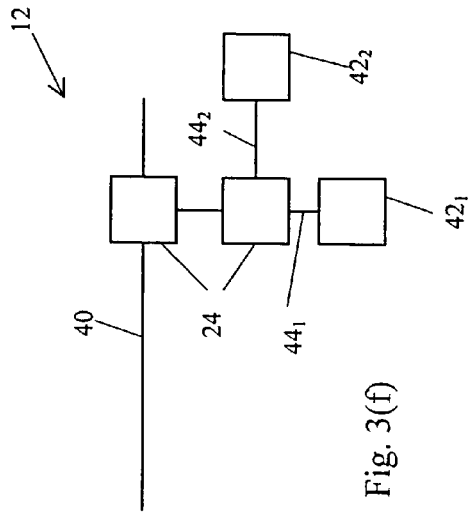
Figure 3H:
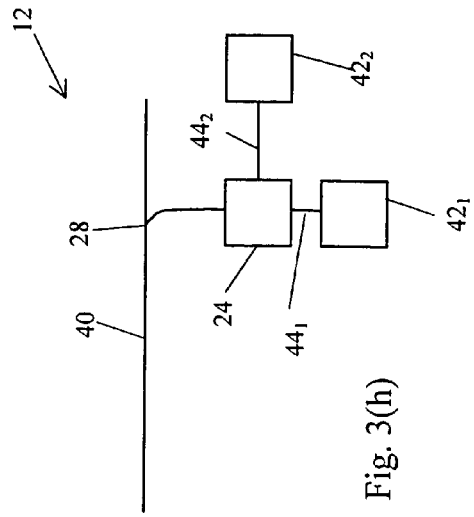
Figure 3E:
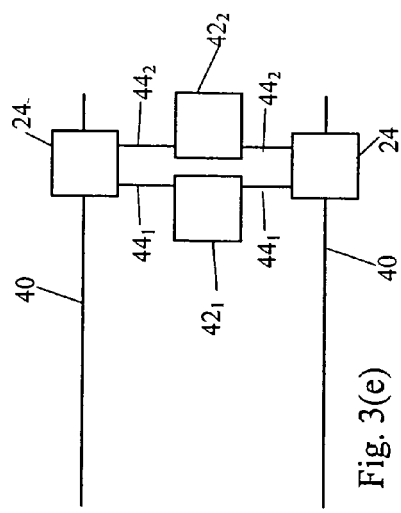
Figure 3G:
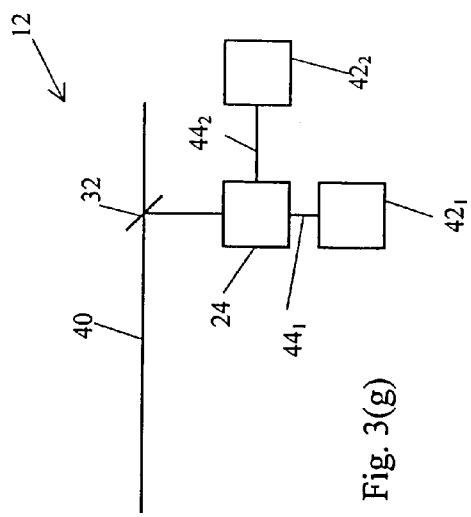
Figure 3J:
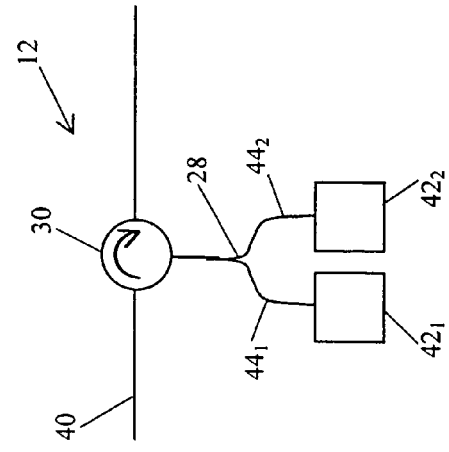
Figure 3L:
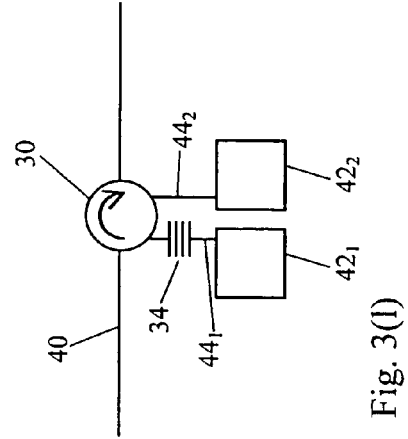
Figure 3I:
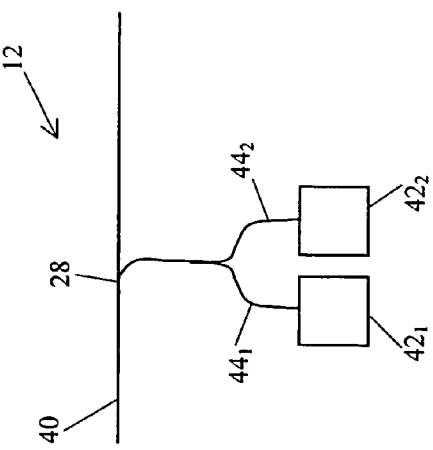

In FIG. 3(c) embodiments, dichroic filters 32 are provided to introduce the pump power from the pump sources $42_1{}^i$ and $42_2{}^i$ to amplifying fiber $40_i$. As further shown, the dichroic filters 32 can be used to introduce pump power from additional pump sources $42_1{}^{i-1}$ and $42_2{}^{i+1}$ into adjacent amplifier stages $40^{i-1}$ and $40^{i+1}$, respectively. Likewise, circulators 30 can also be used to provide pump wavelengths in opposing directions as shown in FIG. 3(d).

The embodiments shown in FIGS. 3(e–l) are exemplary of pump source 42 configurations to provide co-directional pump wavelengths $\lambda_{p1}$ and $\lambda_{p2}$. As shown in FIG. 3(e), the pump sources 42 can be configured to supply pump power, either locally or remotely, to a plurality of amplifying fibers 40 in one or more amplifiers 12. One or more combiner stages can be used to combine the pump wavelengths $\lambda_{p1}$ and $\lambda_{p2}$ as shown in FIG. 3(f). Couplers 28, circulators 30, and dichroic devices 32 can be used in various combinations, as exemplified in FIGS. 3(g–l), to provide co-directional pump power in pump wavelengths $\lambda_{p1}$ and $\lambda_{p2}$ to the amplifying fiber 40.

Figure 3K:
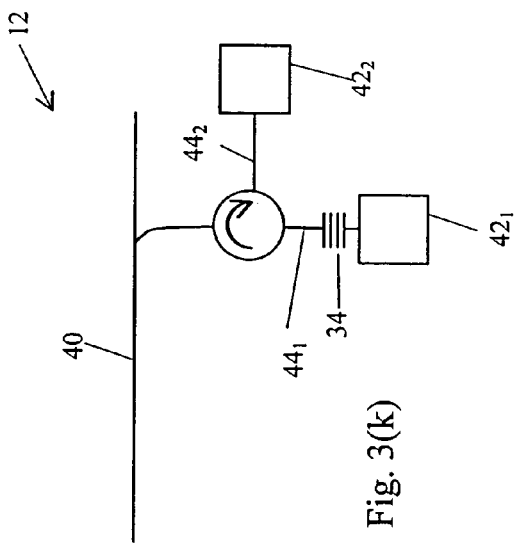

Multiple pump sources 42 can be used to supply power to the amplifier 12 during normal operation. For example, a third pump source $42_3$ can supply power via pumping path $44_3$ to the amplifying fiber as shown in FIG. 3(k). The second pump source $42_2$ can be used to replace power supplied by either or both the first and third pump sources $42_1$ and $42_3$, respectively.

The pump source 42 will generally include one or more fixed or tunable wavelength optical sources 46 to provide power to the amplifying fiber via optical energy carried by one or more pump wavelengths $\lambda_{pi}$ through the pumping paths 44. The optical source 46 will generally include a fixed or tunable wavelength laser, such as DFB, DBR, or other types of semiconductor or fiber lasers. Other coherent or incoherent optical sources can be used as the optical sources 46 depending upon the desired characteristics of the pump source 42.

Figure 4:
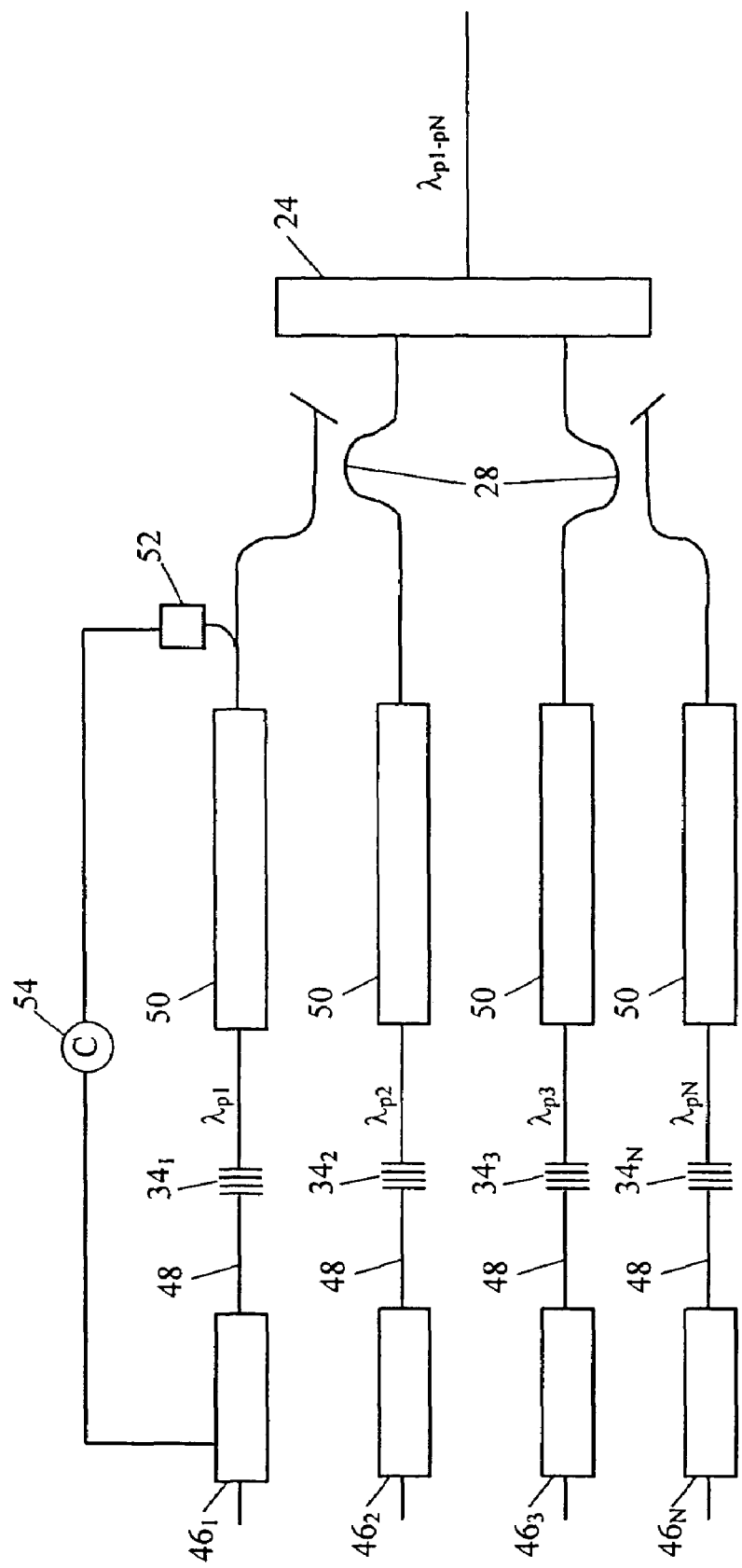

FIG. 4 shows an embodiment of the pump source 42 including one or more optical source $46_N$, each providing optical energy, or pump power, in one or more wavelength ranges $\lambda_{pi}$. The pump wavelengths provided by the optical sources $46_N$ can be stabilized using a reflective element, such as fiber Bragg grating, in a "pigtail" fiber 48 proximate to the source $46_N$ to form an external lasing cavity. Polarization maintaining "PM" fiber can be used as the pigtail fiber 48 to provide additional control over the optical wavelengths emitted by the source $46_N$. A photodiode 52 and optical source controller 54 can be used to provide feedback control over the optical sources $46_N$, as is known in the art.

The pump source 42 can also include one or more depolarization devices 50 to minimize polarization dependent amplifier gain variations that can occur in Raman fiber amplifiers and less frequently in erbium doped fiber amplifiers. An example of suitable depolarization devices include two or more serially coupled PM fiber sections in which the polarization planes of consecutive PM fibers are rotationally offset, thereby causing a polarization realignment of the light passing through the PM fibers. For example, a 45° rotational offset can convert a polarized beam into a substantially unpolarized beam after passing through a sufficient length, i.e., >20 m, of the rotationally offset PM fiber. The polarization of the beam exiting the offset PM fiber section can be controlled by varying the offset angle and length of each offset PM fiber section. The PM fiber design or composition can be varied between the sections to further affect the beam polarization, although dissimilar fibers can excessively increase splice losses.

Alternatively, the depolarization device 50 can include a polarization multiplexer for combining two orthogonal polarized beams into an unpolarized beam. The two beams can be provided by two different optical sources or by one optical source split into two beams.

In operation, the amplifier 12 will be supplied power from at least the first pump source $42_1$. In some embodiments, the second pump path $44_2$ may be unused during normal amplifier operation. Whereas, in other embodiments, the second pump source $42_2$ can be used to provide power to the amplifying fiber 40 during normal operation. If the first pump source $42_1$ needs to be taken out of service, the second pump source $42_2$ is provisioned to supply pump power to the amplifying fiber 40 via the second pumping path $44_2$. The pump power supplied by the second pump source $42_2$ is used to replace the pump power supplied by the first pump source $42_1$ and control the amplifier performance characteristics, such as gain and gain profile, over the signal wavelength range during normal amplifier operation.

The second pump source $42_2$ can be removably or fixedly provisioned to supply pump power to the second pumping path $44_2$. Of course, a removable pump source provides a more flexible design, although various fixed embodiments can provide benefits in practice. For example, the pump sources 42 and the amplifying medium/fiber 40 are often located on physically separate parts, such as line cards, in the amplifier 12 to allow separate replacement of the parts. However, the second pump source $42_2$ can be located on the same part as the amplifying medium 40 and controlled to supply power when the first pump source $42_1$ is being replaced or in other limited circumstances. This embodiment would eliminate the need for service personnel to install a removable pump source before performing a pump maintenance procedure. Broader use of a fixed second pump source $42_2$ can be made, although replacing or repairing a fixed source can increase the complexity of the procedure. Also, both fixed and removable pump sources $42_2$ can be provided for use in the amplifier 12 to provide additional flexibility, if desired.

In one aspect, the second pump source $42_2$ can be used to replace the pump power supplied by the first pump source $42_1$ to the amplifier fiber 40. The first pump source $42_1$ can then be removed from the amplifier 12, when the power supplied by the source $42_1$ has been reduced to a safe level. The first pump source $42_1$ can be repaired or replaced with a replacement pump source, which will typically be a replacement first pump source. The pump power provided by the second pump source $42_2$ can then be replaced by the replacement pump source and the second pump source $42_2$ can be removed. Alternatively, the amplifier can be designed to operate with the second pump source $42_2$ in normal operation.

The replacement of pump power from one pump source with pump power from another pump source is generally performed to replace one or more failed or degrade optical sources 46 in the pump source 42. However, the present invention can be used to change the amplifier performance characteristics, such as upgrading the optical sources used in the pump source or installing new pump sources to achieve amplification over a different signal wavelength bandwidth. For example, a replacement pump source for a Raman amplifier could provide for amplification over a wider bandwidth than the first pump source $42_1$ being replaced. The wider band replacement pump source could be operated at the bandwidth of the first pump source $42_1$, until the additional bandwidth was required. Additionally, the bandwidth of the replacement pump source can be narrowed or shifted to meet the changing capacity demands of the system 10.

The power replacement procedure can be performed either manually by service personnel or under computer control. Pump power replacement via computer can be implemented and controlled either locally or remotely depending upon the optical system embodiment. For example, a service technician at an amplifier site can get instructions provided via a craft or other interface to the network management system 22. Per the instructions, the second pump source $42_2$ can be removably connected to an input port to supply pump power through the second pumping path $44_2$ to the amplifying fiber 40. A network management system 22 processor can then reduce the power supplied by the first pump source $42_1$, while replacing the power using the second pump source $42_2$. When the first pump source $42_1$ power has been reduced to a safe level, the network management system processor can notify the service personnel via the craft interface that the first pump source $42_1$ can be removed. Furthermore, the network management system processor can instruct the service technician to install a replacement pump source, if it is to be installed, and then transition the pump power back to being supplied by the replacement pump source. The network management system 22 can again notify the service technician, when the power supplied by the second pump source $42_2$ has been reduced to a safe level. The service technician can then remove the second pump source $42_2$ and complete the procedure.

The amplifier 12 and the network management system 22 can also be configured to recognize the pump wavelengths associated with the second pump source $42_2$ and the replacement pump source and control the power supplied accordingly. Similarly, when an upgraded pump source is provided in the amplifier 12, the network management system 22 can be used to implement any changes to control scheme and wavelength operation of the amplifier 12.

Thus, the present invention provides for optical systems and amplifiers having improved reliability and availability, as well as flexibility in system configuration design. Those of ordinary skill in the art will further appreciate that numerous modifications and variations that can be made to specific aspects of the present invention without departing from the scope of the present invention. It is intended that the foregoing specification and the following claims cover such modifications and variations.

What is claimed is:

1. A method for operating an optical system, comprising:
powering an optical amplifier with a first pump source over a first signal wavelength bandwidth;
connecting a second pump source to the optical amplifier when it is determined that the first pump source is to be removed;
providing power to the optical amplifier from both the first and second pump source and replacing power supplied to the optical amplifier from the first pump source with power supplied from the second pump source;
removing the first pump source after pump power supplied by the first pump source has been replaced by pump power from the second pump source;
installing a replacement first pump source in place of the first pump source;
providing power to the optical amplifier from both the first and second pump source and replacing power supplied to the optical amplifier from the second pump source with power supplied from the replacement first pump source;
removing the second pump source after pump power supplied by the second pump source has been replaced by pump power from the first pump source; and
transmitting and receiving optical signals in the optical system and amplifying the optical signals passing through the optical amplifier during the steps of connecting a second pump source, replacing power supplied from the first pump source, removing the first pump source, installing a replacement first pump source, replacing power supplied from the second pump source, and removing the second pump source.

2. The method of claim 1, wherein replacing power supplied to the optical amplifier from the second pump source with power supplied from the replacement first pump source further includes maintaining performance characteristics of the optical amplifier.

3. The method of claim 2, wherein replacing power supplied to the optical amplifier includes supplying from the second pump source optical energy in at least one pump wavelength differing from pump wavelengths supplied by the first pump source.

4. The method of claim 2, wherein replacing power supplied to the optical amplifier from the first pump source with power supplied from the second pump source includes supplying from the second pump source optical energy in a plurality of pump wavelengths differing from a plurality of pump wavelengths supplied by the first pump source.

5. The method of claim 2, wherein the optical amplifier is an erbium doped fiber amplifier, and wherein:
powering the optical amplifier with the first pump source includes supplying optical energy in pump wavelengths in the 1460 to 1500 nm range from the first pump source; and
replacing power supplied to the optical amplifier from the first pump source with power supplied from the second pump source includes supplying from the second pump source optical energy in pump wavelengths in the 960 to 985 nm range.

6. The method of claim 2, wherein the optical amplifier is a Raman fiber amplifier, and wherein:
powering the optical amplifier with the first pump source includes supplying optical energy in pump wavelengths in the 1460 to 1500 nm range from the first pump source; and
replacing power supplied to the optical amplifier from the first pump source with power supplied from the second pump source includes supplying from the second pump source optical energy in pump wavelengths in the 1460 to 1500 nm range differing from the pump wavelengths supplied by the first pump source.

7. The method of claim 2, wherein maintaining the performance characteristics of the optical amplifier includes maintaining a signal wavelength gain profile in the amplifier.

8. The method of claim 1, further comprising powering the optical amplifier with the replacement first pump source over a second signal wavelength bandwidth.

9. The method of claim 8, wherein the second signal wavelength bandwidth is wider than the first signal wavelength bandwidth.

10. The method of claim 8, wherein the second signal wavelength bandwidth is shifted relative to the first signal wavelength bandwidth.

11. The method of claim 1, further comprising directing the replacing of power supplied to the optical amplifier from the first pump source with power supplied from the second pump source with a computer.

12. The method of claim 1, further comprising directing the replacing of power supplied to the optical amplifier from the second pump source with power supplied from the replacement first pump source with a computer.

13. An optical system comprising:
at least one optical transmitter configured to transmit optical signals through the optical system;
at least one optical receiver configured to receive the optical signals transmitted through the optical system;
at least one optical amplifier configured to amplify the optical signals being transmitted through the optical system, wherein the at least one optical amplifier includes:
an amplification medium configured to amplify optical signals passing through the medium, when the medium is supplied with power;
a first pump source optically connected to the amplification medium via a first pump path and configured to provide power to the amplification medium; and,
a second pump path optically connected the amplification medium, which is not used during normal operation, but is configured to allow power from a second pump source to be provided to the amplification medium along with power from the first pump source and the replacement of power supplied by the first pump source with power supplied from the second power source, thereby allowing the removal and replacement of the first pump source and the replacement of power from the second pump source with power from the first pump source.

14. The system of claim 13, wherein the second pump source is not connected to the second pump path during normal operation.

15. The system of claim 13, wherein the second pump source is connected to the second pump path, but is not operating during normal operation.

16. The system of claim 13, wherein the second pump source is used to replace power supplied to the optical amplifier from the first pump source with power supplied from the second pump source.

17. The system of claim 16, wherein the first pump source has been disconnected from the first pump path after the power supplied to the optical amplifier from the first pump source has been replaced with power supplied from the second pump source.

18. The system of claim 17, wherein a replacement first pump source is connected to the first pump path while power is being supplied to the optical amplifier from the second pump source.

19. The system of claim 13, wherein:

the at least one optical transmitter is one of a plurality of optical transmitters transmitting optical signals through the system; and, the at least one optical receiver is one of a plurality of optical receivers receiving optical signals in the system.

20. The system of claim 13, wherein the at least one optical amplifier is one of a plurality of optical amplifiers amplifying optical signals in the system.

* * * * *